(12) United States Patent
Dong et al.

(10) Patent No.: US 8,687,326 B2
(45) Date of Patent: Apr. 1, 2014

(54) SHORT CIRCUIT PROTECTING DEVICE AND METHOD THEREOF FOR DC-DC CONVERTER WITH SOFT-START FUNCTION

(75) Inventors: Zhao-Long Dong, Suzhou (CN); Ching-Ji Liang, Taipei (TW)

(73) Assignee: ASUS Technology Pte Ltd., Singapore (SG)

( * ) Notice: Subject to any disclaimer, the term of this patent is extended or adjusted under 35 U.S.C. 154(b) by 485 days.

(21) Appl. No.: 12/831,070

(22) Filed: Jul. 6, 2010

(65) Prior Publication Data

US 2011/0007435 A1    Jan. 13, 2011

(30) Foreign Application Priority Data

Jul. 13, 2009   (TW) ................................ 98123637 A

(51) Int. Cl.
*H02H 7/00*   (2006.01)
(52) U.S. Cl.
USPC ............................................................. 361/18
(58) Field of Classification Search
USPC ............................................................. 361/18
See application file for complete search history.

(56) References Cited

U.S. PATENT DOCUMENTS

| 6,430,070 | B1 | 8/2002 | Shi et al. | |
| 7,863,833 | B2 * | 1/2011 | Tamegai et al. | 315/307 |
| 2007/0064455 | A1 | 3/2007 | Suzuki | |
| 2007/0165347 | A1 | 7/2007 | Wendt et al. | |
| 2008/0136342 | A1 | 6/2008 | Tamegai et al. | |

FOREIGN PATENT DOCUMENTS

| CN | 1719706 | 1/2006 |
| CN | 101099288 | 1/2008 |
| CN | 101217252 | 7/2008 |

* cited by examiner

*Primary Examiner* — Rexford Barnie
*Assistant Examiner* — Tien Mai
(74) *Attorney, Agent, or Firm* — Jianq Chyun IP Office

(57) ABSTRACT

The invention discloses a short circuit protecting device adapted to a DC-DC converter with a soft-start function, and a voltage output terminal of the DC-DC converter increases an output current in segments in multiple time periods after the DC-DC converter is started. The short circuit protecting device including a voltage sensor connected to the voltage output terminal to sense the output voltage; a start timer generating a enable signal in a predetermined period after the DC-DC converter is started; a comparison circuit connected to the voltage sensor and the start timer and comparing the output voltage with a predetermined voltage according to the enable signal. The sum of the time period is a startup time of the DC-DC converter, and the startup time is longer than the predetermined period. When the output voltage is smaller than the predetermined voltage, a comparison circuit outputs a control signal to stop the DC-DC converter.

4 Claims, 8 Drawing Sheets

SHORT CIRCUIT PROTECTING DEVICE AND METHOD THEREOF FOR DC-DC CONVERTER WITH SOFT-START FUNCTION

FIELD OF THE INVENTION

The invention relates to a protecting device adapted to a DC-DC converter and the method thereof and, more particularly, to a short circuit protecting device adapted to a DC-DC converter with a soft-start function and the method thereof.

BACKGROUND OF THE INVENTION

A computer system usually has a power supply for providing stable direct voltage such as 12 volts (V) or 5V for the computer system to make the computer system normally operate. However, the operation voltage adapted to electronic devices such as a central processing unit (CPU), a control chipset or a memory in the computer system is different from the direct voltage provided by the power supply. Therefore, a motherboard on the computer system should have a DC-DC converter to convert a higher direct voltage (such as 12V) to the operation voltage (such as 1.3V) of the electronic devices. The electronic devices may be considered as a load of the DC-DC converter.

FIG. 1 is a schematic diagram showing a conventional DC-DC converter. The DC-DC converter includes a pulse width modulation (PWM) unit 10 and a power stage circuit 30. The PWM unit 10 may output a first driving signal (S1) and a second driving signal (S2), and it also controls the pulse widths of the first driving signal (S1) and the second driving signal (S2).

The power stage circuit 30 includes an upper power FET (M1) and a lower power FET (M2), an output inductor (L) and an output capacitor (C). A drain (D) of the upper power FET (M1) is connected to a voltage input terminal (Vin), a gate (G) of the upper power FET (M1) receives the first driving signal (S1), and a source (S) of the upper power FET (M1) is connected to a first end of the output inductor (L). A drain (D) of the lower power FET (M2) is connected to the first end of the output inductor (L), a gate (G) of the lower power FET (M2) receives the second driving signal (S2), and a source (S) of the lower power FET (M2) is connected to the ground (GND). In addition, a second end of the output inductor (L) is a voltage output terminal (Vout), and the output capacitor (C) is connected between the voltage output terminal (Vout) and the ground (GND). The upper power FET (M1) and the lower power FET (M2) are n-type metal-oxide-semiconductor field-effect transistors (n-MOSFET).

The voltage output terminal (Vout) is connected to the load 50 of the motherboard to provide output voltage (Vout) and output current (Io) to the load 50. The voltage output terminal (Vout) of the DC-DC converter may provide a feedback signal (FB) to the PWM unit 110 to allow the PWM unit to control the first driving signal (S1) and the second driving signal (S2) according to the change of the output voltage (Vout).

Generally, when the load (such as the motherboard or electronic devices) is short circuited, the output current (Io) increases rapidly. Therefore, the upper power FET (M1), the lower power FET (M2) or the output inductor (L) in the power stage circuit 30 may be damaged.

To protect the DC-DC converter, an over current protecting device is provided to sense the output current (Io) of the DC-DC converter. That is, when the output current (Io) exceeds a protecting current (Iocp), the over current protecting device controls the PWM unit to stop outputting the first driving signal (S1) and the second driving signal (S2), and thus the output current (Io) of the DC-DC converter decreases to zero rapidly.

FIG. 2 is a schematic diagram showing a conventional over current protecting device. Supposing that the load is short circuited before the DC-DC converter is started, when the DC-DC converted is started at the time point t1, the first driving signal (S1) and the second driving signal (S2) controls the upper power FET (M1) and the lower power FET (M2) to generate the output current (Io). Since the load 50 is short circuited before the DC-DC converter is started, the upper power FET (M1) and the lower power FET (M2) rapidly generate the output current (Io) to the load 50.

At the time point t2, the output current (Io) reaches the protecting current (Iocp), and the over current protecting device controls the PWM unit 10 to stop outputting the first driving signal (S1) and the second driving signal (S2). Therefore, the output current (Io) of the DC-DC converter rapidly decreases to zero. In addition, as shown in FIG. 2, since the load 50 is short circuited, the output voltage (Vout) is close to zero, and it does not increase along with the output current (Io).

To a general over current protecting device adapted to a DC-DC converter, the load is short circuited before the DC-DC converter is started, and the over current protecting device cannot sense the short circuit and protect the circuit until the output current (Io) increases to the protecting current (Iocp).

To avoid the too-fast increment of the output current (Io) after the DC-DC converter is started, a DC-DC converter with a soft-start function which may limit the current in segments is disclosed. FIG. 3 is a block diagram showing the DC-DC converter with the soft-start function which may limit the current in segments.

The DC-DC converter with the soft-start function which may limit the current in segments includes a PWM unit 110, a power stage circuit 130 and a soft-start controller 160. The PWM unit 110 may output the first driving signal (S1) and the second driving signal (S2) and controls the pulse widths of the first driving signal (S1) and the second driving signal (S2). In addition, the power stage circuit 30 generates an output current (Io) to the load 50 at the voltage output terminal (Vout) according to the first driving signal (S1) and the second driving signal (S2). The operating principle of the power stage circuit 130 is the same as that of the power stage circuit in FIG. 1, and it is not illustrated again for a concise purpose.

The soft-start controller 160 includes a current sensor 162 and a segmented current limiter 164. The current sensor 162 senses the output current (Io), and the segmented current limiter 164 controls the PWM unit 110 and further control the pulse widths of the first driving signal (S1) S1 and the second driving signal (S2) according to the current signal generated by the current sensor 162.

Generally, the DC-DC converter with the soft-start function which may limit the current in segments has a startup time, and the segmented current limiter 164 may control the PWM unit 110 according to the current signal outputted by the current sensor 162 in the startup time, thereby increasing the output current (Io) in segments.

FIG. 4 is a schematic diagram showing the signal of the conventional DC-DC converter with the soft-start function which may limit the current in segments. When normally started, the segmented current limiter 164 limits the output current (Io) at multiple current levels (such as 10A, 20A and so on) at different time periods. As shown in FIG. 4, the DC-DC converter is started at the time point t1, and the output current (Io) rapidly increases to a first current level 10A. At that moment, the segmented current limiter 164 controls the PWM unit 110 to limit the output current (Io) at the first current level.

At the time point t2, the segmented current limiter 164 controls the PWM unit 110 to increase the output current (Io). When the output current (Io) increases to a second current level 20A, the segmented current limiter 164 controls the PWM unit 110 to limit the output current (Io) at the second current level.

At the time point t3, the segmented current limiter 164 controls the PWM unit 110 to increase the output current (Io). At that moment, the output current (Io) increases to a stable current level (28A), and at the time point t4, it is determined that the output current (Io) is kept in the stable current level.

As illustrated above, under normal circumstance, with the increment of the output current (Io), the corresponding output voltage (Vout) increases, too. When the output current (Io) reaches the stable state, the output voltage (Vout) also reaches the stable state. In addition, the time period from t1 to t4 is the startup time, and each time period in FIG. 4 is approximately 200 microseconds (µs). Furthermore, since the protecting current (Iocp) (such as 50A) is set to be larger than the stable current, the over current protecting device does not operate, and the DC-DC converter operates normally.

FIG. 5 is a schematic diagram showing the signal of the DC-DC converter with the soft-start function which may limit the current in segments. In FIG. 5, the load is short circuited before the DC-DC converter is started. At the time point t1, the DC-DC converter is started. Since the load is short circuited, in the first time period t1 to t2, the segmented current limiter 164 controls the PWM unit 110 to limit the output current (Io) at the first current level (10A); at the second time period t2 to t3, the segmented current limiter 164 controls the PWM unit 110 to limit the output current (Io) at the second current level (20A); at the third time period t3 to t4, the segmented current limiter 164 controls the PWM unit to limit the output current (Io) at the third current level (30A), at the fourth time period t4 to t5, the segmented current limiter 164 controls the PWM unit 110 to limit the output current (Io) at the fourth current level (40A), and at the fifth time period t5 to t6, the segmented current limiter 164 controls the PWM unit 110 to limit the output current (Io) at the fifth current level (50A).

Since the protecting current (Iocp) of the DC-DC converter is predetermined to be 50A, after the fifth time period t5 to t6, the over current protecting device is started. As shown in FIG. 5, the output current (Io) does not decrease to zero until the time point t6. In addition, the time period between time points t1 to t6 is the startup time, and each time period is approximately 200 µs.

If the load is short circuited before starting the conventional DC-DC converter with the soft-start function which may limit the current in segments, the over current protecting device does not operate until the startup time passes. Therefore, the output current (Io) cannot be sensed by the over current protecting device until the output current (Io) reaches the protecting current (Iocp) after the startup time.

SUMMARY OF THE INVENTION

The invention discloses a short circuit protecting device adapted to a DC-DC converter with a soft-start function which may limit current in segments and the method thereof. The short circuit protecting device and method disclosed in the invention may sense whether a load of the DC-DC converter is short circuited in a startup time.

The invention discloses a short circuit protecting device adapted to a DC-DC converter with a soft-start function. A voltage output terminal of the DC-DC converter may increase an output current in segments in multiple time periods after the DC-DC converter is started. The short circuit protecting device including a voltage sensor, a start timer and a comparison circuit. The voltage sensor is connected to the voltage output terminal to sense an output voltage. The start timer generates an enable signal in a predetermined period after the DC-DC converter is started. The comparison circuit is connected to the voltage sensor and the start timer, and it may compare the output voltage with a predetermined voltage according to the enable signal. The sum of the time periods is a startup time of the DC-DC converter, and the startup time is longer than the predetermined period. When the output voltage is smaller than the predetermined voltage, the comparison circuit outputs a control signal to control the DC-DC converter stop operating.

The invention further discloses a short circuit protecting method adapted to a DC-DC converter with a soft-start function. A voltage output terminal of the DC-DC converter may increase an output current in segments in multiple time periods after the DC-DC converter is started. The short circuit protecting method includes the following steps: starting timing when the DC-DC converter is started; comparing the output voltage with a predetermined voltage after a predetermined period; and controlling the DC-DC converter to stop operating when the output voltage is smaller than the predetermined voltage. The sum of the time periods is a startup time of the DC-DC converter, and the startup time is longer than the predetermined period.

These and other features, aspects and advantages of the present invention will become better understood with regard to the following description, appended claims, and accompanying drawings.

DETAILED DESCRIPTION OF THE PREFERRED EMBODIMENT

Figure 1:
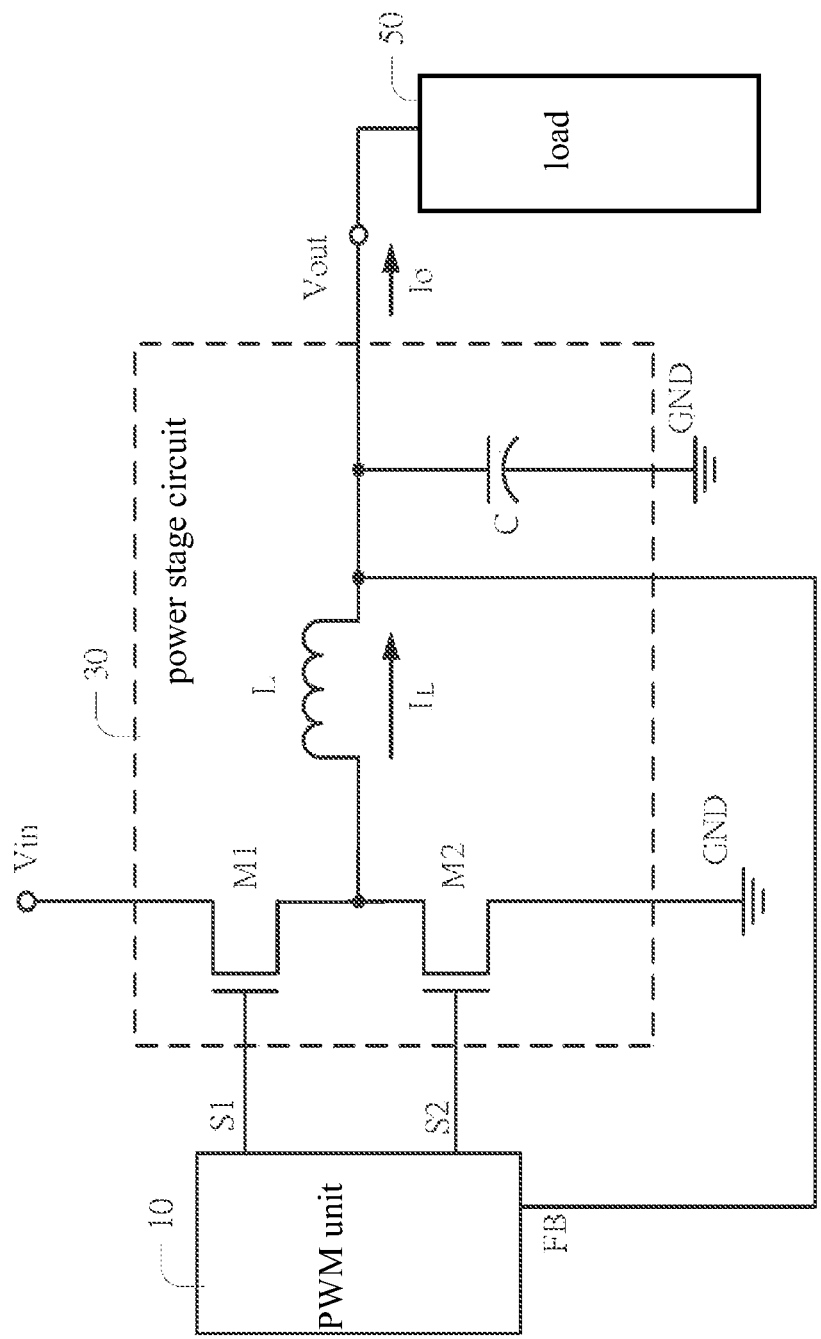
FIG. 1 is a schematic diagram showing a conventional DC-DC converter.
Figure 2:
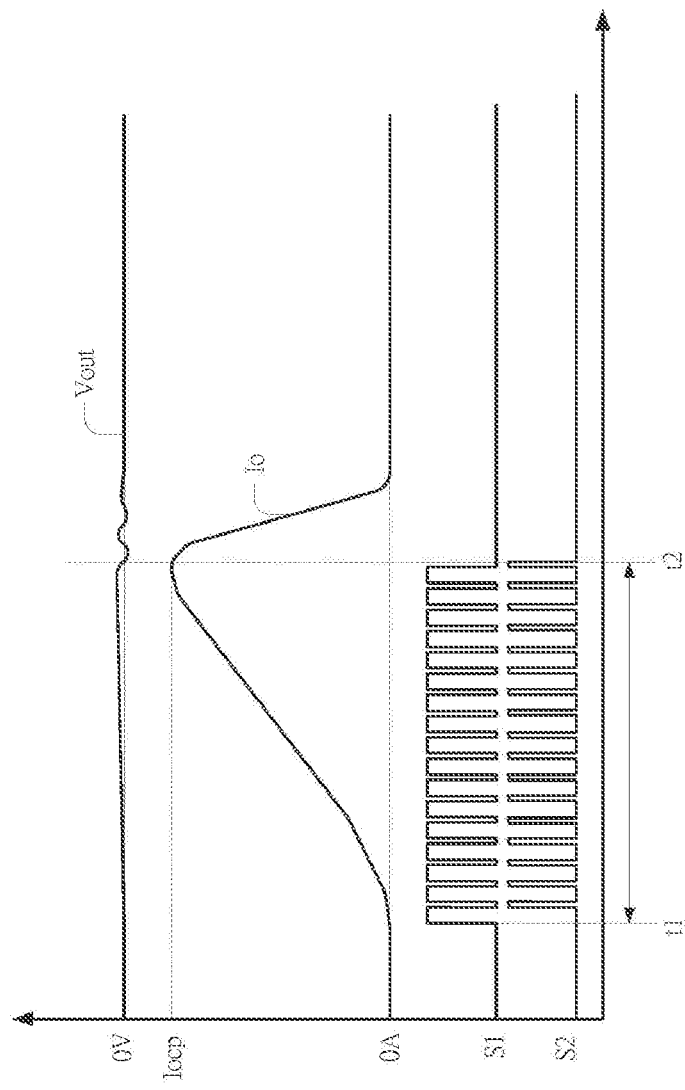
FIG. 2 is a schematic diagram showing the signal in a conventional over current protecting device.
Figure 3:
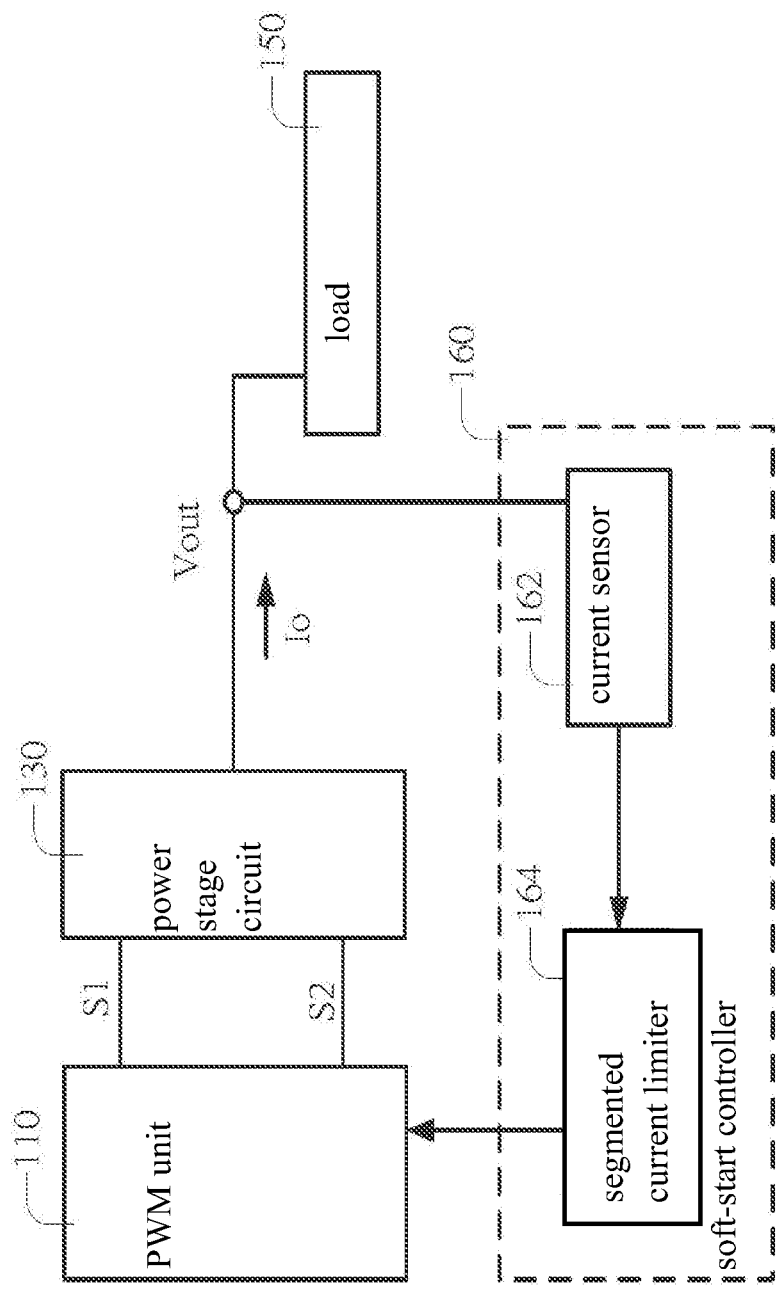
FIG. 3 is a block diagram showing the conventional DC-DC converter with the soft-start function.
Figure 4:
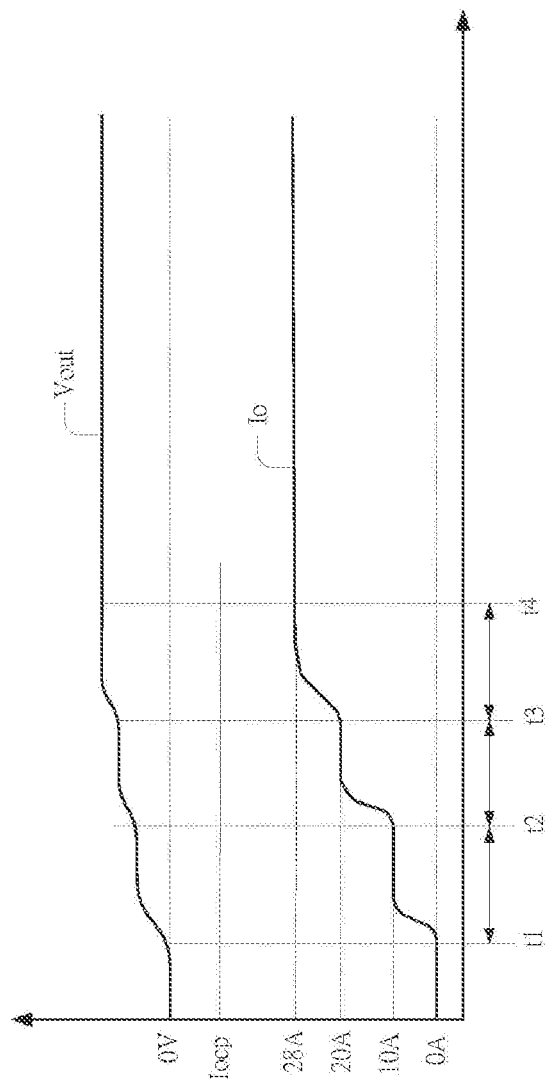
FIG. 4 is a schematic diagram showing the signal of the conventional DC-DC converter with the soft-start function.
Figure 5:
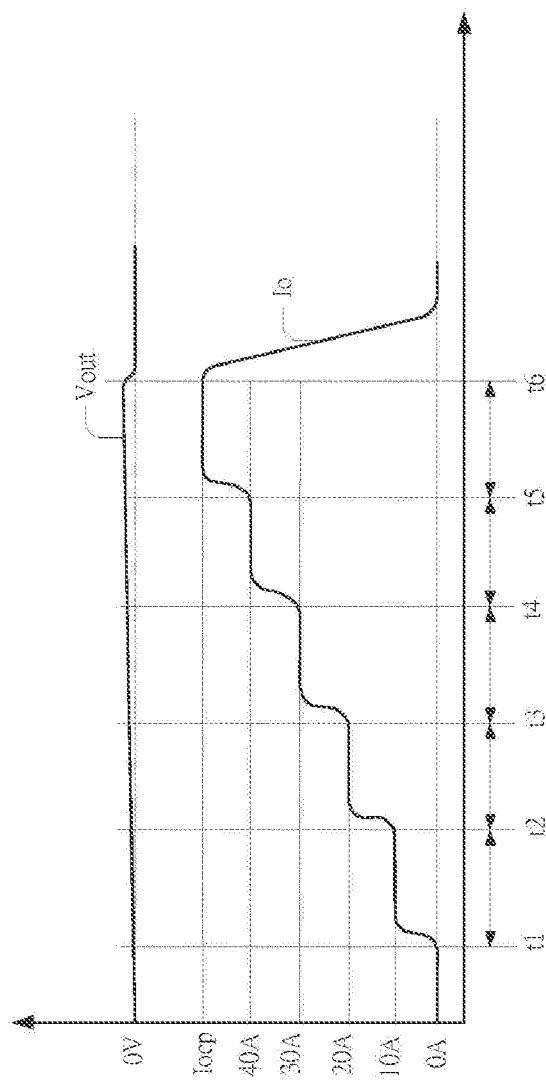
FIG. 5 is a schematic diagram showing the signal of the conventional DC-DC converter with the soft-start function.
Figure 6:
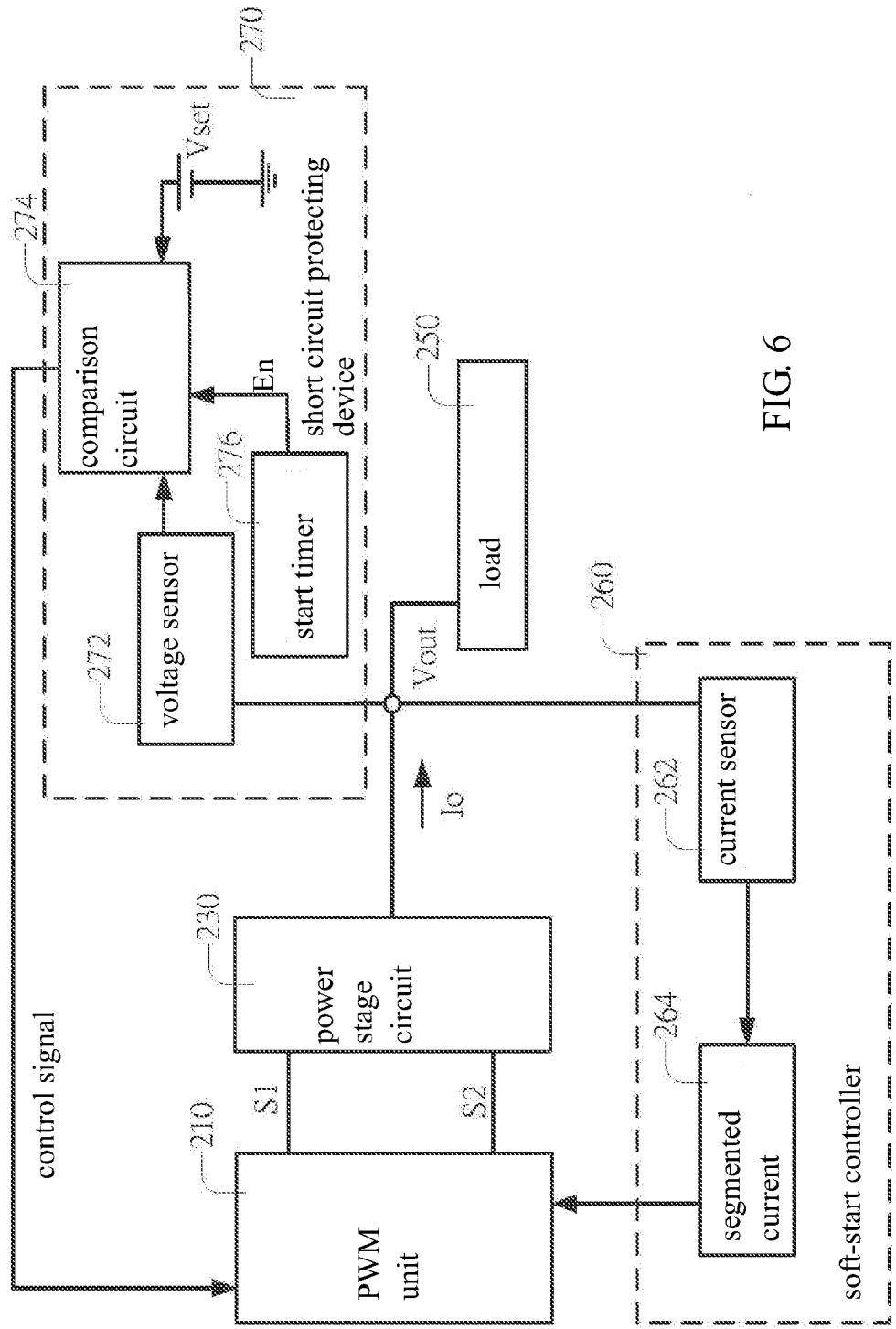
FIG. 6 is a block diagram showing a DC-DC converter with a soft-start function in an embodiment of the invention.

FIG. 6 is a block diagram showing a DC-DC converter with a soft-start function in an embodiment of the invention. The DC-DC converter with the soft-start function includes a PWM unit 210, a power stage circuit 230, a short circuit protecting device 270 and a soft-start controller 226. The PWM unit 210 may output a first driving signal (S1) and a second driving signal (S2), and it also may control the pulse widths of the first driving signal (S1) and the second driving signal (S2). In addition, the power stage circuit 230 generates an output current (Io) at a voltage output terminal (Vout) to a load 250 according to the first driving signal (S1) and the second driving signal (S2). The operating principle of the power stage circuit 230 is the same as that in FIG. 1, and it is not illustrated again.

In addition, the soft-start controller 260 includes a current sensor 262 and a segmented current limiter 264. The current sensor 262 senses the output current (Io), and the segmented current limiter 264 controls the PWM unit 210 and further controls the pulse widths of the first driving signal (S1) and the second driving signal (S2) according to the current signal generated by the current sensor 262.

The DC-DC converter with the soft-start function according to the invention has a startup time. The segmented current limiter 264 controls the PWM unit 210 according to the current signal outputted by the current sensor 262 in the startup time, thereby increasing the output current (Io) in segments.

According to the embodiment in the invention, the short circuit protecting device 270 senses whether the short circuit happens in the load 250 in the startup time of the DC-DC converter. When the short circuit happens, the short circuit protecting device 270 controls the PWM unit 210 to stop outputting the first driving signal (S1) and the second driving signal (S2), and thus stops the DC-DC converter. When the DC-DC converter operates normally, the output voltage (Vout) increases along with the increment of the output current (Io), and when the load of the DC-DC converter is short circuited, the output voltage (Vout) does not increase along with the increment of output current (Io). As a result, in the invention, whether the load is short circuited in the startup time is sensed, and the DC-DC converter may stop operating immediately when the short circuit happens. Thus, the short circuit can be sensed by the over current protecting device even the output current (Io) does not reach the protecting current (Iocp).

In addition, the short circuit protecting device 270 includes a voltage sensor 272, a start timer 276 and a comparison circuit 274. When the DC-DC converter is started, the start timer 276 starts to time, and after a predetermined period (T), an enable signal (En) is generated and transmitted to the comparison circuit 274. The comparison circuit 274 then compares the output voltage (Vout) with the predetermined voltage (Vset). When the output voltage (Vout) is smaller than the predetermined voltage (Vset), the comparison circuit 274 determines that the load 250 is short circuited, and the control signal outputted by the comparison circuit 274 controls the PWM unit 210 to stop outputting the first driving signal (S1) and the second driving signal (S2), thereby stopping the DC-DC converter.

On the contrary, when the output voltage (Vout) is larger than the predetermined voltage (Vset), the comparison circuit 274 determines that the load 250 is not short circuited, and the control signal outputted by the comparison circuit 274 controls the PWM unit 210 to go on outputting the first driving signal (S1) and the second driving signal (S2), thereby keeping the DC-DC converter operating.

According to the embodiment of the invention, the predetermined period (T) is preferably set to be longer than a time period (200 μs) set by the soft-start controller. That is, the short circuit is preferably determined after the output current (Io) increases from the first current level to the second current level.

Figure 7:
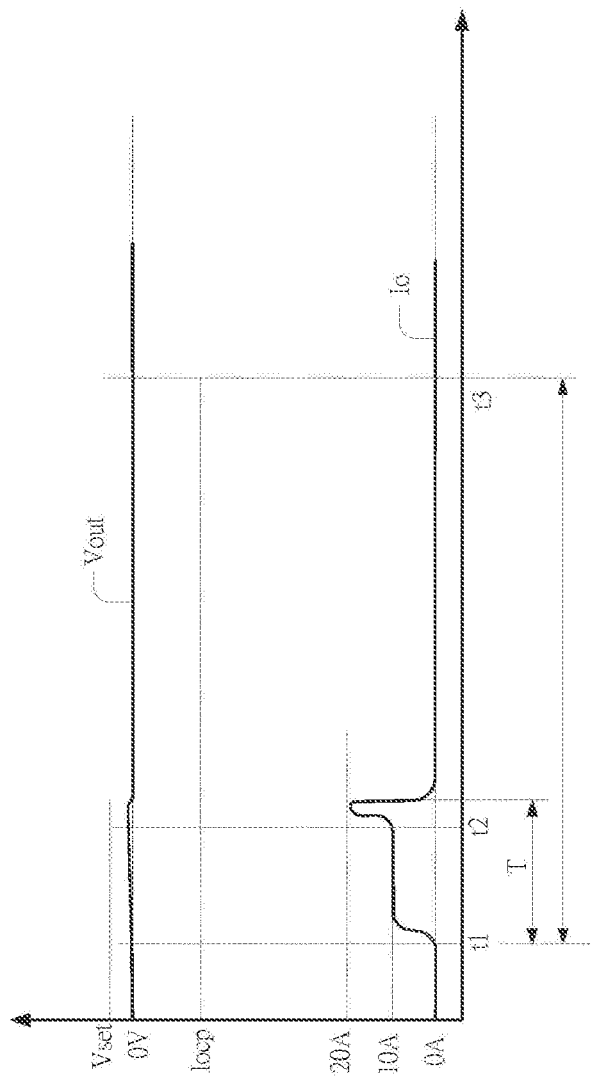
FIG. 7 is a schematic diagram showing the signal of the DC-DC converter with the soft-start function in an embodiment of the invention.

FIG. 7 is a schematic diagram showing the signal of the DC-DC converter with the soft-start function in an embodiment of the invention. In FIG. 7, the load is short circuited before the DC-DC converter is started. At the time point t1, the DC-DC converter is started. Since the load is short circuited, in the first time period t1 to t2 the segmented current limiter 264 controls the PWM unit 210 to limit the output current (Io) at the first current level (10A).

In addition, in the second time period, the start timer 276 times the predetermined period (T). At that moment, when the output voltage (Vout) received by the comparison circuit 274 is smaller than the predetermined voltage (Vset), the comparison circuit 274 determines that the load 250 is short circuited, and the DC-DC converter stops operating and the output current (Io) decreases to zero.

As shown in FIG. 7, in the invention, whether the load is short circuited can be determined after the predetermined period (T). Comparing with the conventional technology in which the over current protecting device cannot sense the short circuit until the startup time t1 to t3 passes and the output current (Io) reaches the protecting current (Iocp), the invention may stop the operation of the DC-DC converter quickly, and prevent the upper power FET (M1), the lower power FET (M2) or the output inductor (L) in the power stage circuit 230 from being damaged.

Figure 8:
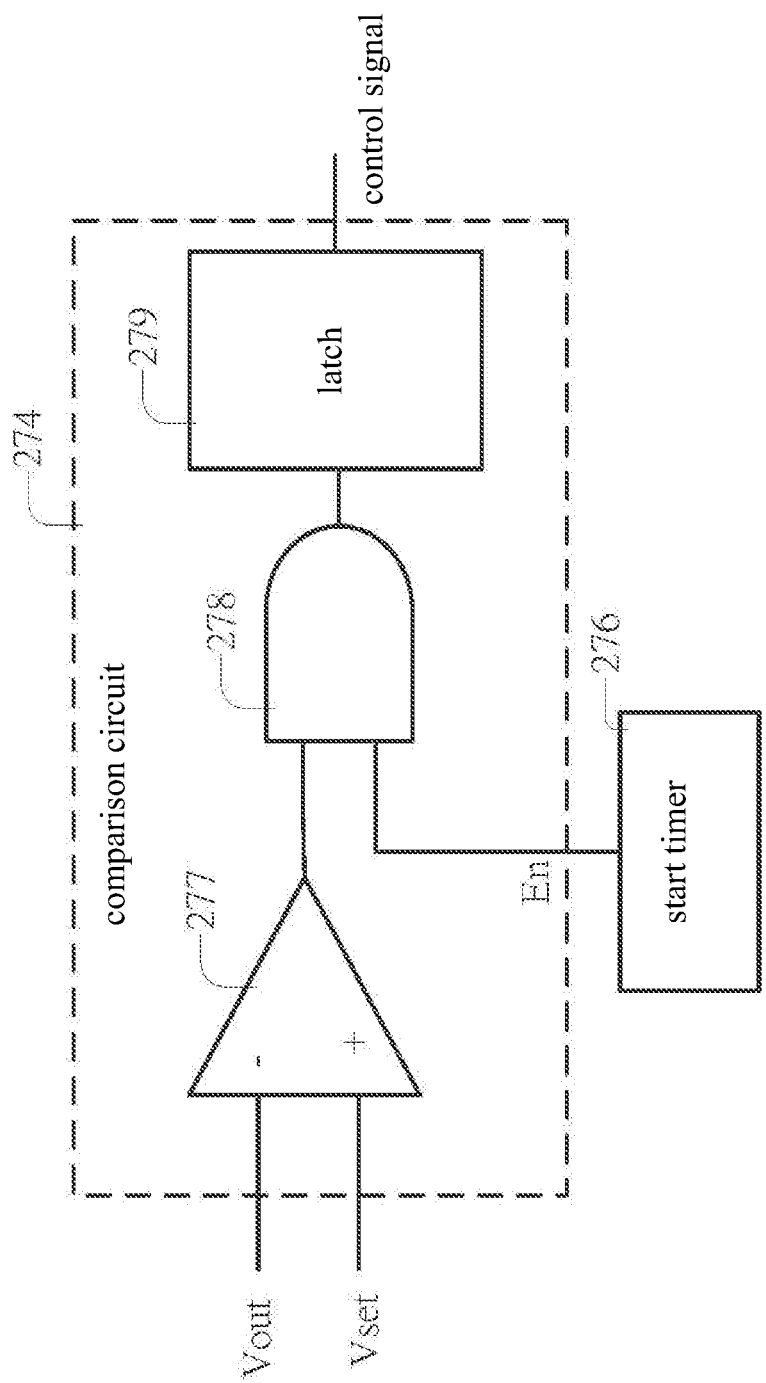
FIG. 8 is a schematic diagram showing the comparison circuit in an embodiment of the invention.

FIG. 8 is a schematic diagram showing comparison circuit in an embodiment of the invention. The comparison circuit 274 includes a comparator 277, an AND gate 278 and a latch 279. A positive end of the comparator 277 receives the predetermined voltage (Vset), and a negative end receives the output voltage (Vout). Two input ends of the AND gate 278 are respectively connected to an output end of the comparator 277 and the start timer 276. The latch 279 is connected to the output end of the AND gate 278 and generates the control signal.

When the DC-DC converter is started, the start timer 276 starts to time. After a predetermined period (T), a high-level enable signal (En) is generated and transmitted to the AND gate 278. When the short circuit happens, the output voltage (Vout) is smaller than the predetermined voltage (Vset). Therefore, the comparator 277 outputs the high-level signal to the AND gate 278 to make the level of the output end of the AND gate 278 high. Therefore, the latch 279 may output the high-level control signal to the PWM unit to make the PWM unit 210 stop outputting the first driving signal (S1) and the second driving signal (S2), and stop the DC-DC converter.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A short circuit protecting device adapted to a direct current to direct current (DC-DC) converter with a soft-start function, wherein a voltage output terminal of the DC-DC converter is capable of increasing an output current in segments in multiple time periods after the DC-DC converter is started, the short circuit protecting device comprising:

a voltage sensor connected to the voltage output terminal to sense an output voltage;

a start timer generating an enable signal after a predetermined period; and a comparison circuit connected to the voltage sensor and the start timer, wherein the comparison circuit is capable of comparing the output voltage with a predetermined voltage according to the enable signal, wherein the comparison circuit comprises:

a comparator whose positive end receives the predetermined voltage and negative end receives the output voltage;

an AND gate having two input ends connected to an output end of the comparator and the start timer, respectively; and a latch connected to an output end of the AND gate and capable of generating a control signal, wherein a startup time consists of the multiple time periods, and the sum of the time periods in length is the length of the startup time of the DC-DC converter, and the startup time is longer than the predetermined period, wherein within the startup time, the comparison circuit compares the output voltage with the predetermined voltage according to the enable signal after the predetermined period, when the output voltage is smaller than the predetermined voltage, the comparison circuit outputs the control signal to stop the DC-DC converter.

2. The short circuit protecting device according to claim 1, wherein the DC-DC converter comprises:

a pulse width modulation (PWM) unit outputting a first driving signal and a second driving signal; and a power stage circuit generating an output current at the voltage output terminal according to the first driving signal and the second driving signal.

3. The short circuit protecting device according to claim 2, further comprising a soft-start controller, wherein the soft-start controller includes a current sensor and a segmented current limiter, the current sensor senses the output current, and the segmented current limiter controls the PWM unit and further controls pulse widths of the first driving signal and the second driving signal according to a current signal generated by the current sensor, thereby increasing the output current in segments.

4. The short circuit protecting device according to claim 1, wherein the predetermined period is respectively longer than each of the time periods within the startup time.

* * * * *